Aug. 30, 1966        F. L. JONES        3,269,856
COATING FOR REFRACTORY METAL
Filed June 7, 1962
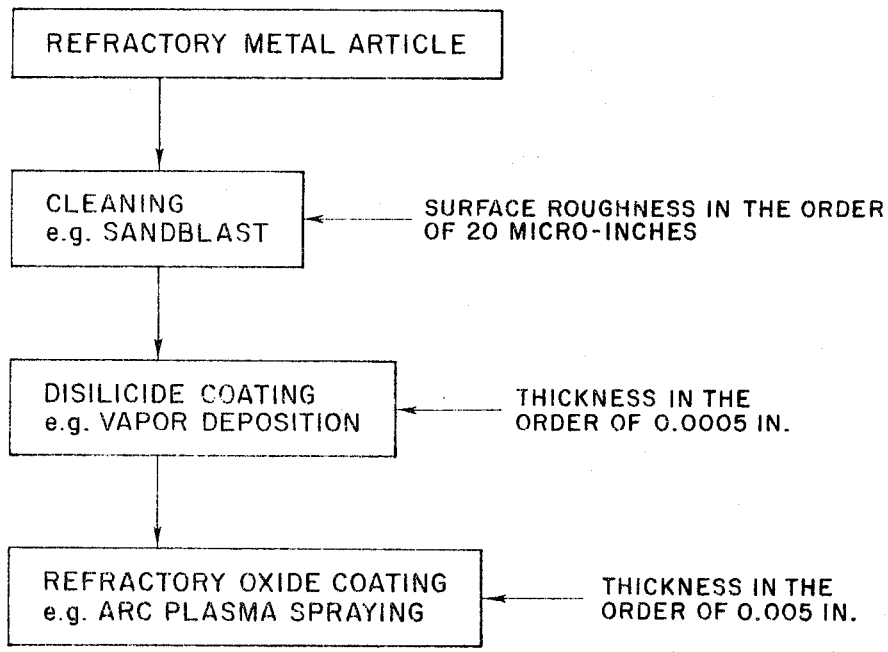
*INVENTOR.*
FRANCIS LEE JONES
BY
               Agent 3,269,856
COATING FOR REFRACTORY METAL
Francis L. Jones, Atlanta, Ga., assignor to Lockheed Aircraft Corporation, Burbank, Calif.
Filed June 7, 1962, Ser. No. 200,835
4 Claims. (Cl. 117—70)

This invention relates to a high temperature resistant coating for metals, and more particularly to a high temperature oxidation resistant coating for a refractory material.

With the advent of the space age, it has become essential to design a space vehicle which may be launched into space and reenter the atmosphere without being adversely affected by the high thermal environment it is exposed to during the exit and reentry phases of the flight. Refractory metals (defined as having a melting temperature of more than 3,000° F.) appear to meet these requirements in that they have structural integrity up to temperatures approaching their melting point; however, they are subject to rapid oxidation at elevated temperatures below their melting point. The need therefore arises for a protective coating system for the surface of such metals to effectively seal the refractory metal surface and thus prevent contact of oxygen with the metal substrate. Much work has been done in the past to develop protective coatings for refractory metals and such coating techniques as electroplating coating, flame spray coating, ceramic glass coating and vapor deposition coating have been attempted with various degrees of success. Each of the above mentioned coating systems has at least one good characteristic but is deficient in at least one other respect. For example, the electroplated coatings have the advantage of high ductility, but they lose their structural properties in elevated temperatures; while vapor deposition coatings have a tendency to be brittle. Such limitations and disadvantages of prior art devices are substantially eliminated in accordance with this invention by the use of a combination coating system.

Accordingly, it is an object of this invention to provide a high heat resistant coating system which will withstand high temperatures over long periods of time.

Another object of this invention is to provide a temperature resistant coating for materials which will withstand high temperatures over relatively long periods of time, yet is substantially impact resistant.

A further object of this invention is to provide a refractory material with an oxidation resistant coating which is stable over a relatively long period of time at high temperatures up to in the order of 3,100° F.

A still further object of this invention is to provide a refractory metal with a vapor deposited disilicide coating of the base metal in combination with an arc plasma spray overcoating of a refractory oxide defined as having a melting temperature of more than 3,000° F.

Another object of this invention is to provide a refractory metal with an oxidation resistant chemically bonded coating of a thin disilicide of the base metal in combination with a mechanically bonded impact resistant and high heat resistant overcoating of an arc plasma sprayed refractory oxide.

Other objects and advantages will become apparent from the following description taken in connection with the accompanying drawing which is a flow sheet illustrating one preferred series of steps embodying the invention.

Generally stated, the invention comprises the coating of a refractory material with a coating which is impact resistant and temperature resistant at elevated temperatures over relatively long periods of time. More specifically, a preferred embodiment of the invention comprises vapor depositing on the surface of a refractory metal which is desired to be protected against oxidation, a disilicide of the refractory metal, then depositing a dense refractory oxide coating on the disilicide by an arc plasma spray technique to protect the refractory disilicide and refractory metal from oxidation and impact.

Referring now to FIGURE 1, there is illustrated one preferred series of steps for carrying out the above process on a refractory metal. The surface of the refractory metal to be coated should have a surface roughness in the order of 20 micro inches in at least one direction to provide anchor points with which the refractory oxide can mechanically adhere; however, for optimum results a surface roughness in the order of 20 micro inches in both directions, longitudinally and transversely, is preferred. Accordingly, the refactory metal may be grit blasted with a very hard, fine mesh material, preferably alumina ($Al_2O_3$) to obtain a 19 to 24 micro inch surface roughness in two directions prior to coating.

After assuring that the proper surface roughness is present, the refractory metal is cleaned by conventional anodic processing. The refractory metal is then coated with a layer of disilicide of the refractory metal having a thickness in the order of 0.0005 inch by reacting silicon tetrachloride with the refractory metal in a hydrogen atmosphere at an elevated temperature by a process known in the art as vapor deposition. A thin disilicide coating is employed so that the refractory metal anchor points will retain their identity through the disilicide. The disilicide coating thus provided has good oxidation resistant properties but is relatively brittle. The disilicide coating is overcoated in accordance with this invention with an oxidation resistant refractory oxide which renders it substantially impact resistant by acting as a cushion and absorbing impact which would normally crack the more brittle disilicide.

The refractory oxide is mechanically bonded to the disilicide coating by an arc plasma spraying technique to obtain a dense overcoating. It is because the refractory oxide is mechanically bonded to the disilicide that the surface of the refractory metal, for optimum results, should have a surface roughness in the order of 20 micro inches in both directions to provide a maximum number of well defined anchor points or protuberances to which the refractory oxide can adhere. For this reason the thickness of the disilicide should be in the order of 0.0005 inch so as not to cover up the anchor points on the refractory metal surface having a roughness in the above mentioned range. Further, it has been found that the thickness of the refractory oxide overcoating should be in the order of 0.005 inch for optimum results to be obtained because a thicker coating has a tendency to flake off under impact while a thinner coating provides insufficient oxidation resistance and impact resistance. It will be appreciated that in certain coating applications where stress concentrations are not a limiting factor, the surface roughness of the refractory metal could be made greater than 20 micro inches and the refractory discilicide could be made correspondingly thicker without covering up the anchor points. Under such condition a good mechanical bond could be achieved between the refractory oxide overcoating and the disilicide because the refractory metal anchor points would retain their identity through the refractory disilicide.

By way of a more specific example of the invention, a molybdenum specimen having a surface roughness in the order of 20 micro inches was coated with a 0.00050 inch thick layer of molybdenum disilicide by the vapor deposition method and overcoated with a 0.0050 inch thick layer of alumina by an arc plasma spray technique. This specimen was tested in a blast flame capable of bringing the specimen surface temperature to 3,500° F. The erosion resistance of the coating was measured by directing an air stream carrying sixty mesh alumina grit (300 grams/minute) against the specimen surface after the specimen surface had been heated to a temperature in the order of 2,500° F. with a blast flame. The stream of grit and air cooled the surface to room temperature in approximately one minute and when the specimen reached room temperature the grit stream was turned off and then flame heated again to 2,500° F. to repeat the cycle until failure. This test method was cyclically repeated ten times before failure occurred. A specimen was also subjected to a blast flame in the order of 3,100° F. and showed no oxidation for 40 minutes, while one subjected to a temperature of 3,500° F. lasted for ten minutes but was on the verge of catastrophic failure. In contrast, present systems show a definite temperature limitation at approximately 3,000° F.

While a particular embodiment of the invention has been illustrated and described, it will be obvious to those skilled in the art that various changes and modifications may be made without departing from the invention and it is intended to cover in the appended claims all such modifications and equivalents as fall within the true spirit and scope of this invention.

What is claimed is:
1. The method of forming coated refractory metal articles impact resistant and resistant to oxidation at elevated temperatures comprising the steps of coating the refractory metal with a thickness in the order of 0.0005 inch of the disilicide of said refractory metal by vapor deposition, and overcoating said disilicide coating with a thickness in the order of 0.005 inch of a refractory oxide by arc plasma spraying.

2. The method of forming refractory metal bodies impact resistant and resistant to oxidation at elevated temperatures comprising the steps of providing the surface of said metal body with a surface roughness in the order of 20 micro inches in at least one direction, coating said surface with a thickness in the order of 0.0005 inch of the refractory metal by a vapor deposition method, and overcoating said disilicide coating with a thickness in the order of 0.005 inch of a refractory oxide by arc plasma spraying.

3. An impact resistant and elevated temperature oxidation resistant protective coating on a refractory metal consisting essentially of a vapor deposited disilicide of the base refractory metal having a thickness in the range of 0.00025 to 0.001 inch overcoated with an arc plasma sprayed refractory oxide having a thickness in the range of 0.003 to 0.010 inch.

4. An impact resistant and elevated temperature oxidation resistant protective coating on a refractory metal having a surface roughness in the order of 20 micro inches consisting essentially of a vapor deposited disilicide of the base refractory metal having a thickness in the range of 0.00025 to 0.001 inch overcoated with an arc plasma sprayed refractory oxide having a thickness in the range of 0.003 to 0.010 inch.

References Cited by the Examiner
UNITED STATES PATENTS

| | | | |
|---|---|---|---|
| 2,665,997 | 1/1964 | Campbell et al. | 117—106 |
| 2,707,691 | 5/1955 | Wheildon | 117—105.2 |
| 2,857,297 | 10/1958 | Moore et al. | 148—6 |
| 2,902,392 | 9/1959 | Fitzer | 148—6.3 X |

WILLIAM D. MARTIN, *Primary Examiner.*

RICHARD D. NEVIUS, *Examiner.*

H. W. MYLIUS, *Assistant Examiner.*